UNITED STATES PATENT OFFICE.

GUSTAVE SCHWAHN, OF BELLEVILLE, ILLINOIS.

PRODUCTION OF ALUMINUM OXID.

1,132,737.   Specification of Letters Patent.   Patented Mar. 23, 1915.

No Drawing.   Application filed January 15, 1912.   Serial No. 671,295.

*To all whom it may concern:*

Be it known that I, GUSTAVE SCHWAHN, a citizen of the United States, and a resident of the city of Belleville, in the county of St. Clair and State of Illinois, have invented certain new and useful Improvements in Processes for the Production of Aluminum Oxid, of which the following is a specification.

The aluminum industry, as it exists to-day, is divisible into two parts, the production of alumina, and the electrolytic reduction of alumina to aluminum.

This invention relates to the first mentioned division, the production of alumina suitable for commercial electrolytic reduction to aluminum, and has for its object the total elimination of sodium and the reduction in quantity of other impurities in such product.

Alumina to be of a quality suitable for commercial electrolytic reduction to aluminum must be pure and low in cost. It must be in a finely divided state suitable for solution in baths of molten aluminum fluorids used as an electrolyte in the electrolytic reduction of alumina to aluminum. The process hereinafter described produces such alumina in the form of impalpable powder without grinding or mechanical pulverizing, the said alumina being a purer and cheaper ore of aluminum than any heretofore produced.

In the aluminum industry alumina is at this time being made from bauxite by a process comprising the use of soda, an aluminate of soda being made from the bauxite. Alumina has also been made from cryolite, a double fluorid of aluminum and sodium, the product being substantially free from all impurities with the exception of sodium carbonate. All of the said alumina in commercial use to-day comprises some measure of sodium, which is an objectionable impurity being reduced with the aluminum and having deleterious effects thereon.

Attempts have been made by men connected with the aluminum industry, to produce alumina by processes other than those involving sodium with the object in view of producing purer and cheaper alumina. These attempts were chiefly of two kinds. One kind comprised endeavors to make use of the fact that alumina may be dissolved out of clay or bauxite with sulfuric acid. The other kind comprised the melting of bauxite in electric arc furnaces with fluxes, segregation of impurities, crushing and grinding, and the separation of iron magnetically. None of these attempts to produce alumina suitable for commercial electrolytic reduction to aluminum, by processes not comprising the use of sodium, have proved successful.

This process contemplates the use of sulfuric acid to dissolve out the alumina from earthy materials, forming aluminum sulfate, and the subsequent reduction of the aluminum sulfate thus produced to alumina, the sulfuric acid being driven off in such form that it can readily be used over and over.

Aluminum sulfate may be made from a great variety of earthy materials by this process, and a further object of this invention is the production of alumina suitable for electrolytic reduction to aluminum from ores hitherto unsuited to the purpose. For example, as this process makes the elimination of silica feasible, it makes new ores of aluminum available, namely, various aluminum silicates, such as kaolinite, pholerite, and the like, which with more or less sand and other matters make up bodies of clay. A good ore, for example, is the non-plastic fire clay or flint clay found in pocket deposits in Missouri. This material is remarkably pure, large bodies of it comprising not more than one per cent. or two per cent. impurities not being unusual. These clays cost materially less per unit of weight of alumina contained therein than bauxite. The cost of the extraction of the alumina from the said clays is less by the process herein described than the cost of extraction of alumina from bauxite by any soda process per unit of weight of product.

Clay or bauxite is crushed and ground, and heated to a low color producing temperture, about 650 degrees centigrade. This treatment breaks up the material, adds oxygen to ferrous iron present, and makes the alumina more soluble and the iron present less soluble in sulfuric acid. With some clays, such as Truesdale clay, it is advisable to quench the heated clay in water after heating. The clay is then treated with dilute sulfuric acid which dissolves the alumina, forming aluminum sulfate, but does not dissolve silica. Iron in the ferric form is very slow to dissolve. This solution should be neutral, or very low in free acid. The silica and ferric iron contained in suspension in the solution are removed by settling, decantation, and filtration. The solution of aluminum sulfate is boiled down. The hydrous aluminum sulfate produced is broken up and then heated to remove the water, a porous anhydrous aluminum sulfate being produced. If by any process all of the sulfur can be removed from pure aluminum sulfate $Al_2(SO_4)_3$, the product must be pure alumina, provided no impurities, such as sodium, are introduced in the process of desulfurization. Upon heating aluminum sulfate in various ways, it readily parts with a large fraction of the sulfur. Aluminum sulfate, however, holds very tenaciously to a small fraction of the said sulfur. The desulfurization of aluminum sulfate under commercial conditions presents no difficulty till after the sulfur has been reduced to perhaps about 7% of the weight of the product, but a product comprising sulfur in the neighborhood of the said amount is worthless for commercial electrolytic reduction to aluminum. In this process the aluminum sulfate to be treated must be low in free acid, or free from uncombined acid, in order that it may be calcined so as to form a porous mass. The calcination, to produce a porous anhydrous aluminum sulfate, must be carried out in a thin mass of the material. The material is then heated to an orange red or medium orange color, the conditions of heating being such that the material is substantially uniformly heated. A temperature of about 1100 degrees centigrade is a good temperature. The material, both sulfate and alumina, is a non-conductor of heat and a poor retainer of heat. Complete desulfurization apparently depends upon the porous character and thin mass of the aluminum sulfate treated, and upon the means used for conducting heat into the said mass and of the time during which the heating takes place. If during the operation conditions arise causing the material to vitrify, which condition may be indicated by grittiness, the said vitrification prevents further desulfurization. A hard alumina may be formed comprising sulfur, alumina that it would require the high temperature of the electric arc furnace to melt. It is one of the features of this process that when properly operated, such vitrification is prevented. Water, water vapor or gas containing hydrogen is brought in contact with and is caused to thoroughly penetrate substantially uniformly heated portions of the material. The said vapors or gases may be made to pass through stationary material, or may be made to pass across a stream of material, or with or against a stream of the material. One of the dimensions of the stationary mass or moving mass or stream of material must be small in order to insure uniform heating and intimate uniform contact throughout the said mass of the water or steam with the material at proper temperatures. Sulfur compounds are formed and pass off in the form of gases, leaving sulfur free alumina in the form of an impalpable powder. This powder is removed from the furnace, and on account of its form requires no further treatment to prepare it for electrolytic reduction to aluminum as carried on commercially.

The chemistry of the process of desulfurization is similar to the chemistry of the manufacture of sulfuric acid by the chamber process from brimstone.

Dissociation of the sulfur and alumina is not a simple function of temperature; that is, it does not simply take place suddenly at some fixed and definite temperature regardless of other conditions. It is known to sulfuric acid specialists that in the concentration of sulfuric acid, water dissociates in the presence of sulfur gases at temperatures below those corresponding to the temper colors of steel. Nascent hydrogen and nascent oxygen consequently, no doubt, exist during the carrying out of the process under consideration and one or both of the said nascent gases may play an important part with respect to complete desulfurization. The gases formed in the reduction of the sulfate to alumina are collected and conducted into sulfuric acid chambers, where they are treated to form sulfuric acid suitable for use in my process of sulfate making.

The acid used in my process for dissolving alumina is dilute sulfuric acid. It is commercially correct to make such acid by the chamber process and not by the catalytic process. Consequently, in making sulfuric acid from the sulfur gases given off by the aluminum sulfate to be used in again dissolving alumina, one of the economical features of the process under consideration, it is commercially correct, from an acid making standpoint, to use the chamber process. It is consequently unimportant whether the sulfur gases produced are $SO_3$ or $SO_2$ or any other compound of sulfur and oxygen, so long as the desulfurization of the aluminum sulfate is complete.

Having described the application of my process commercially, what I claim as of my invention in said process is as follows:

1. The process of producing sodium free alumina in the form of an impalpable powder which consists in treating a thin moving mass of uniformly heated aluminum sulfate with water vapor until all the contained sulfuric acid is removed.

2. The process of producing acid free alumina from sulfate of aluminum which consists in rapidly and uniformly heating aluminum sulfate in a mass of little thickness in comparison with its area of heating surface and passing steam through the heated mass.

3. The process of producing acid free aluminum oxid which consists in uniformly heating to incandescence a relatively thin mass of aluminum sulfate having a large area exposed to the heat, and passing steam through said mass.

4. The process of producing acid free alumina which consists in uniformly heating a wide thin mass of porous aluminum sulfate to incandescence in the presence of air and then introducing water vapor as long as the sulfur gases continue to be produced.

5. The process of producing alumina substantially free of sulfur which comprises heating a thin mass of aluminum sulfate in the presence of a moving gas mass comprising highly heated water vapor, said heating being to a temperature hgher than the dissociating point of sulfur trioxid.

6. The process of producing alumina substantially free of sulfur which comprises heating a progressively moving thin mass of aluminum sulfate in the presence of a moving gas mass comprising highly heated water vapor, such heating being to temperatures higher than the dissociation point of sulfur trioxid.

Signed at St. Louis, Missouri, this 12th day of January, 1912.

GUSTAVE SCHWAHN.

Witnesses:
A. M. HOLCOMBE,
M. A. SHELTON.